United States Patent
Trummer

(10) Patent No.: US 10,871,562 B2
(45) Date of Patent: Dec. 22, 2020

(54) IMAGING RADAR SENSOR WITH HORIZONTAL DIGITAL BEAM FORMING AND VERTICAL OBJECT MEASUREMENT BY PHASE COMPARISON IN MUTUALLY OFFSET TRANSMITTERS

(71) Applicant: ASTYX GmbH, Ottobrunn (DE)

(72) Inventor: Guenther Trummer, Ottobrunn (DE)

(73) Assignee: ASTYX GmbH

( * ) Notice: Subject to any disclaimer, the term of this patent is extended or adjusted under 35 U.S.C. 154(b) by 509 days.

(21) Appl. No.: 15/515,738

(22) PCT Filed: Oct. 6, 2015

(86) PCT No.: PCT/EP2015/073018
§ 371 (c)(1),
(2) Date: Mar. 30, 2017

(87) PCT Pub. No.: WO2016/055455
PCT Pub. Date: Apr. 14, 2016

(65) Prior Publication Data
US 2017/0293028 A1    Oct. 12, 2017

(30) Foreign Application Priority Data
Oct. 6, 2014 (DE) .......... 10 2014 014 864

(51) Int. Cl.
*G01S 13/931* (2020.01)
*G01S 13/34* (2006.01)
(Continued)

(52) U.S. Cl.
CPC .............. *G01S 13/931* (2013.01); *G01S 7/41* (2013.01); *G01S 13/345* (2013.01);
(Continued)

(58) Field of Classification Search
CPC .......... G01S 13/931; H01Q 1/32; H01Q 3/24; H01Q 3/26
See application file for complete search history.

(56) References Cited

U.S. PATENT DOCUMENTS 5,008,678 A * 4/1991 Herman ................. G01S 13/87
                                                     342/158
5,600,326 A * 2/1997 Yu ......................... G01S 7/2813
                                                     342/149
(Continued)

FOREIGN PATENT DOCUMENTS

CN    102116860    7/2011
CN    102288952    12/2011
(Continued)

OTHER PUBLICATIONS

Mayer, "Imaging rader sensor with transmit antenna switched group antenna", ISBN 978-3-86727-565-1, Feb. 2008, 202 pages (partial machine translation).
(Continued)

Primary Examiner — Peter M Bythrow
(74) Attorney, Agent, or Firm — Fish & Richardson P.C.

(57) ABSTRACT

According to the invention, a device and a method are provided for determining the position of an object, in particular a moving object, in the three-dimensional space. The device comprises at least two switchable transmitting antennas having a different vertical position of the phase center as well as a plurality of receiving antennas which are arranged in series. The transmitting antennas are arranged in the horizontal direction and at a distance that corresponds to the distance of the receiving antennas. The transmitting antennas are vertically offset with respect to each other by a value that is less than or equal to half the free-space wavelength of the transmitted signal. The transmitting antennas can otherwise be arranged at any position around
(Continued)

the receiving antenna. Horizontal beam sweep across a wide angular range is carried out according to the method of "digital beamforming". The measurement of the vertical object position is carried out by phase measurement between the antenna beams when the transmitting antennas are sequentially switched.

13 Claims, 4 Drawing Sheets

(51) Int. Cl.

| | | |
|---|---|---|
| *G01S 13/42* | (2006.01) | |
| *G01S 13/44* | (2006.01) | |
| *G01S 13/536* | (2006.01) | |
| *H01Q 21/06* | (2006.01) | |
| *H01Q 3/26* | (2006.01) | |
| *H01Q 1/32* | (2006.01) | |
| *H01Q 13/20* | (2006.01) | |
| *G01S 7/41* | (2006.01) | |
| *H01Q 3/24* | (2006.01) | |
| *H01Q 25/02* | (2006.01) | |
| *G01S 13/935* | (2020.01) | |

(52) U.S. Cl.
CPC ........ *G01S 13/424* (2013.01); *G01S 13/4445* (2013.01); *G01S 13/4454* (2013.01); *G01S 13/536* (2013.01); *H01Q 1/32* (2013.01); *H01Q 3/24* (2013.01); *H01Q 3/26* (2013.01); *H01Q 13/206* (2013.01); *H01Q 21/065* (2013.01); *H01Q 25/02* (2013.01); *G01S 13/935* (2020.01)

(56) References Cited

U.S. PATENT DOCUMENTS

| | | | | | |
|---|---|---|---|---|---|
| 6,094,172 | A | * | 7/2000 | Koscica | H01Q 13/206 |
| | | | | | 343/700 MS |
| 6,246,365 | B1 | * | 6/2001 | Tokoro | G01S 13/42 |
| | | | | | 342/149 |
| 8,305,258 | B2 | * | 11/2012 | Yamada | G01S 13/931 |
| | | | | | 342/123 |
| 8,344,940 | B2 | * | 1/2013 | Jeong | G01S 7/4026 |
| | | | | | 342/75 |
| 8,432,307 | B2 | * | 4/2013 | Cornic | G01S 13/933 |
| | | | | | 342/29 |
| 8,436,763 | B2 | * | 5/2013 | Wintermantel | G01S 13/4454 |
| | | | | | 342/70 |
| 8,717,224 | B2 | * | 5/2014 | Jeong | G01S 13/931 |
| | | | | | 342/70 |
| 9,182,476 | B2 | * | 11/2015 | Wintermantel | G01S 7/2926 |
| 9,194,940 | B2 | * | 11/2015 | Asanuma | G01S 13/42 |
| 9,203,160 | B2 | * | 12/2015 | Blech | H01Q 21/061 |
| 9,568,600 | B2 | * | 2/2017 | Alland | G01S 7/03 |
| 9,638,796 | B2 | * | 5/2017 | Binzer | H01Q 21/08 |
| 9,817,110 | B2 | * | 11/2017 | Koerber | G01S 7/032 |
| 9,880,262 | B2 | * | 1/2018 | Hayakawa | G01P 15/00 |
| 2004/0027305 | A1 | * | 2/2004 | Pleva | G01S 13/343 |
| | | | | | 343/853 |
| 2004/0246168 | A1 | * | 12/2004 | Isaji | G01S 7/03 |
| | | | | | 342/70 |
| 2005/0024261 | A1 | * | 2/2005 | Fujita | G01S 7/4026 |
| | | | | | 342/174 |
| 2008/0258964 | A1 | * | 10/2008 | Schoeberl | G01S 13/931 |
| | | | | | 342/189 |
| 2008/0291077 | A1 | * | 11/2008 | Chang | G01S 13/90 |
| | | | | | 342/59 |
| 2009/0046000 | A1 | * | 2/2009 | Matsuoka | G01S 13/426 |
| | | | | | 342/147 |
| 2010/0123616 | A1 | * | 5/2010 | Minami | G01S 7/4021 |
| | | | | | 342/147 |
| 2011/0074620 | A1 | * | 3/2011 | Wintermantel | G01S 7/285 |
| | | | | | 342/70 |
| 2011/0163906 | A1 | * | 7/2011 | Yang | H01Q 1/3233 |
| | | | | | 342/27 |
| 2014/0062762 | A1 | | 3/2014 | Yashuhiro | |
| 2014/0104097 | A1 | * | 4/2014 | Binzer | G01S 13/02 |
| | | | | | 342/74 |
| 2014/0340253 | A1 | * | 11/2014 | Koerber | G01S 13/58 |
| | | | | | 342/104 |

FOREIGN PATENT DOCUMENTS

| | | |
|---|---|---|
| CN | 104067138 | 9/2014 |
| DE | 2004/059915 | 6/2006 |
| DE | 102008052246 | 4/2010 |
| DE | 102009046499 | 5/2010 |
| DE | 2010/064348 | 7/2012 |
| DE | 2011/113018 | 3/2013 |
| DE | 2013/102424 | 9/2014 |
| JP | H11287857 | 10/1999 |
| JP | 2000284047 | 10/2000 |
| JP | 2009290294 | 12/2009 |
| JP | 2010117313 | 5/2010 |
| JP | 2010127641 | 6/2010 |
| JP | 2011526373 | 10/2011 |
| JP | 2013113644 | 6/2013 |
| JP | 2014052187 | 3/2014 |
| JP | 2014529076 | 10/2014 |
| JP | 2014219290 | 11/2014 |
| JP | 2012098107 | 5/2019 |
| KR | 19990082850 | 11/1999 |
| WO | 2010/066458 | 6/2010 |
| WO | 2013/034282 | 3/2013 |
| WO | WO2013/034282 | 3/2013 |
| WO | 2014/004505 | 1/2014 |
| WO | 2014/139992 | 9/2014 |

OTHER PUBLICATIONS

International Preliminary Report on Patentability for PCT/EP2015/073018 dated Apr. 11, 2017 (with translation).
International Search Report and Written Opinion issued by ISA/EP dated Dec. 4, 2015 for PCT/EP2015/073018.
Korean Office Action in Korean Application No. 10-2017-7009277, dated Aug. 28, 2018, 40 pages.
CN Office Action in Chinese Appln. No. 201580054478.5, dated Aug. 6, 2019, 18 pages (with English Translation).
JP Office Action in Japanese Appln. No. 2017-518240, dated Jul. 2, 2019, 7 pages (with English translation).
JP Office Action in Japanese Appln. No. 2017-518240, dated Mar. 3, 2020, 6 pages (with English translation).
EP Office Action issued in European Appln. No. 15775208.0, dated Sep. 10, 2020, 12 pages (with English Translation).
JP Office Action in Japanese Appln. No. 2017-518240, dated Oct. 13, 2020, 4 pages (with English Translation).

* cited by examiner

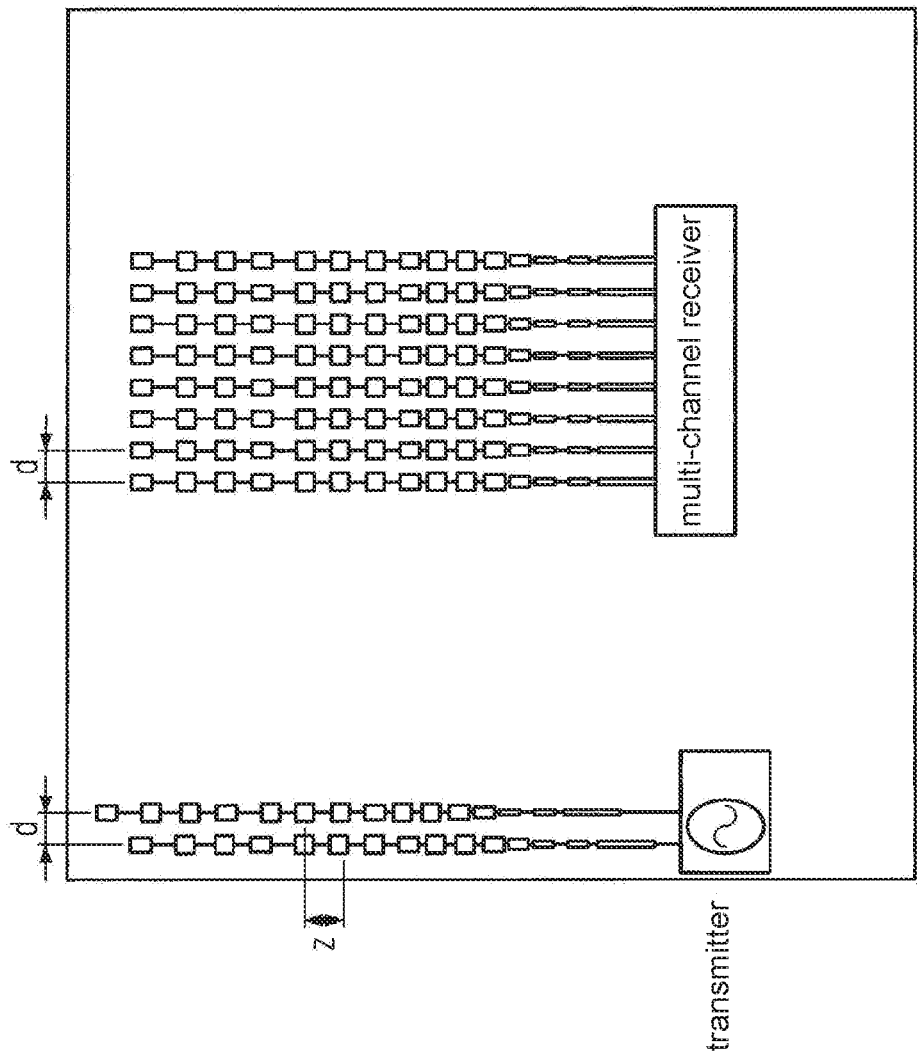
Figure 1: Physical arrangement of transmitters and receivers

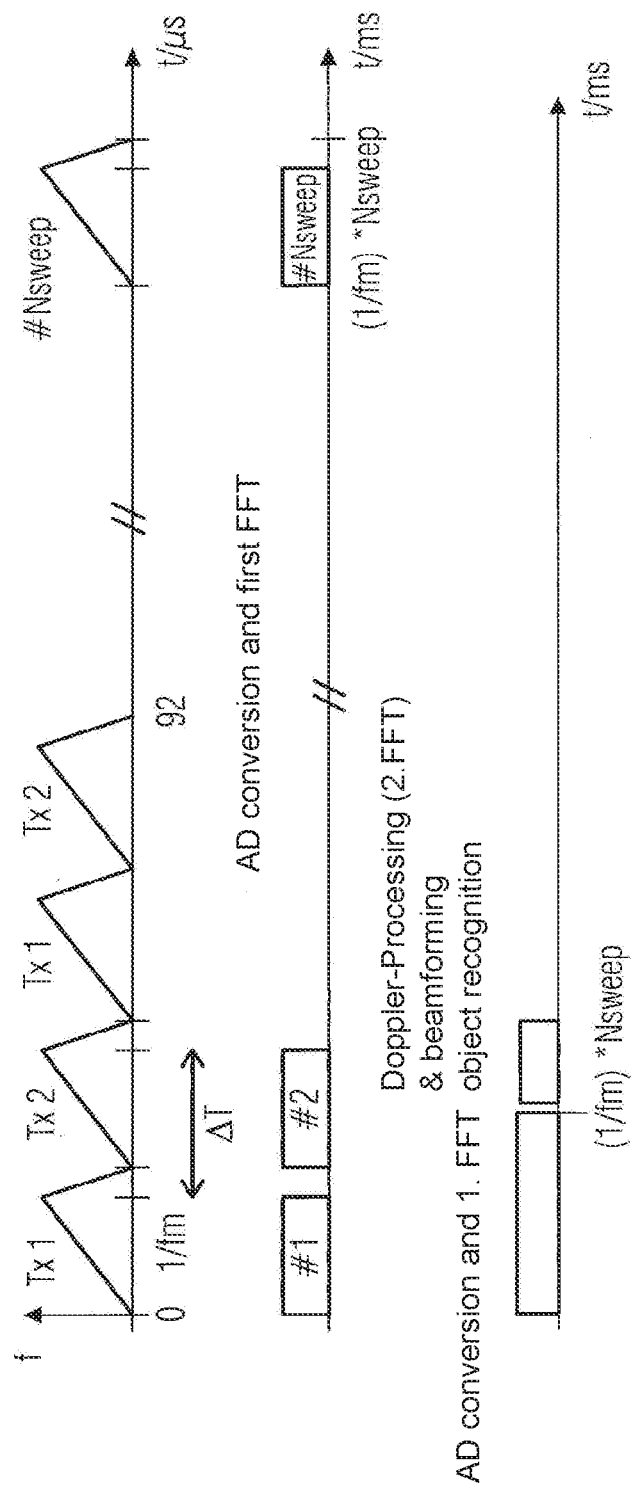
Figure 2: Time chart and modulation form

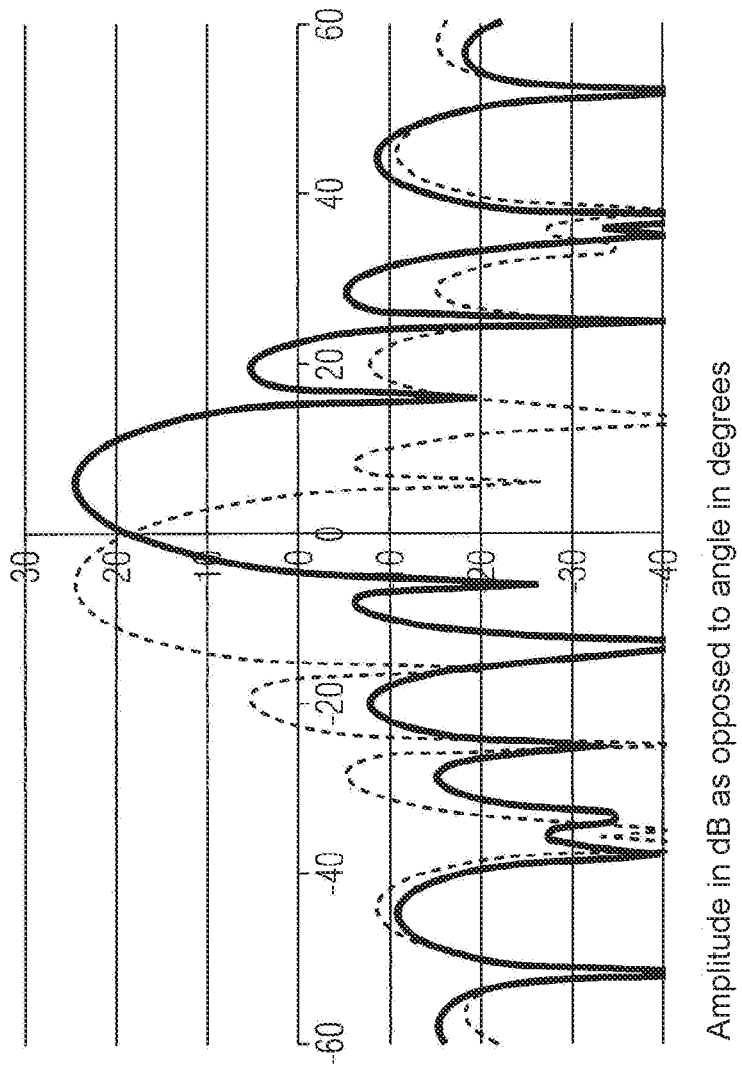

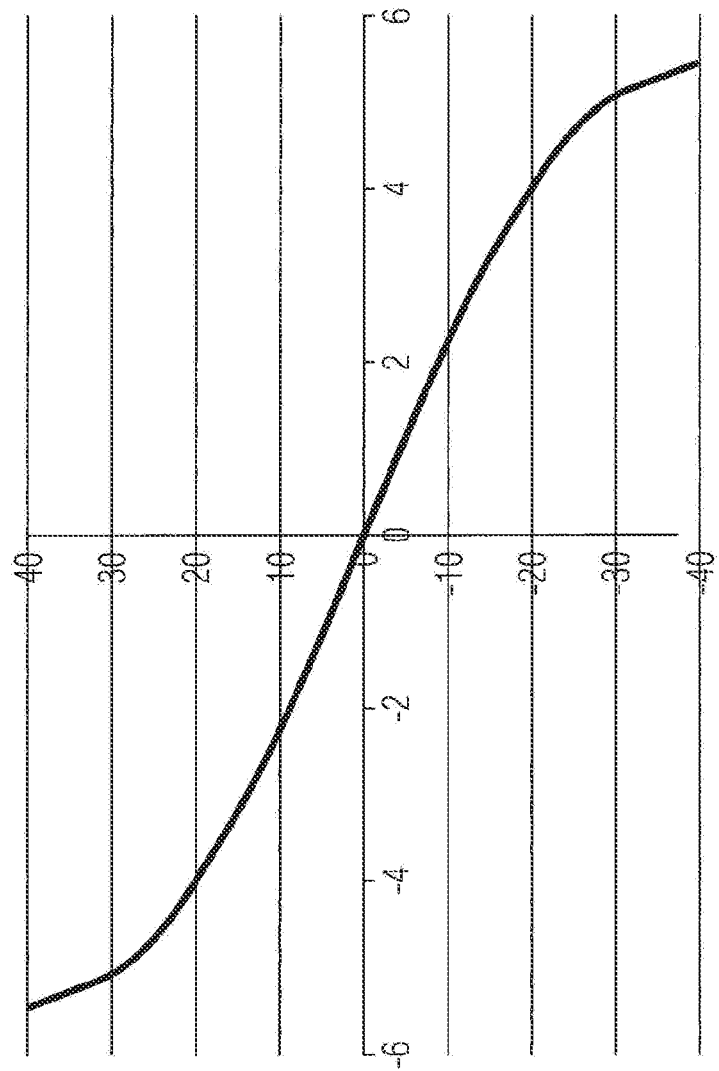

IMAGING RADAR SENSOR WITH HORIZONTAL DIGITAL BEAM FORMING AND VERTICAL OBJECT MEASUREMENT BY PHASE COMPARISON IN MUTUALLY OFFSET TRANSMITTERS

TECHNICAL FIELD OF APPLICATION

The invention relates to a method for measuring the vertical position of objects with a radar sensor which carries out two interleaved horizontal scans.

Millimeter wave radar sensors, e.g. for automotive and aeronautical applications, should exhibit a compact and inexpensive construction.

The detection is restricted to just one plane (mostly the horizontal plane), as is the case with most automotive radar sensors, and so this can take place inexpensively by using planar antennas and a number of receivers. The beamforming and control takes place here according to the principle of "digital beamforming".

As the demand for reliability increases, in particular radar sensors in the automotive domain should be capable of distinguishing between irrelevant obstacles such as bridges and sign gantries and objects lying on the road which pose a risk to the road traffic.

In the aeronautical domain these sensors have also been used in recent times for the close range monitoring of helicopters. Here, three-dimensional measurement of obstacles, in particular in the take off and landing phase, is required. A purely two-dimensional measurement is not sufficient.

PRIOR ART

Known from the dissertation written by Dr. Winfried Mayer and entitled "Imaging radar sensor with group antenna connected on the transmitting side", Cuvillier Verlag, Göttingen 2008, ISBN 978-3-86727-565-1 is a method and a device which monitors an area using the digital beamforming technique in which an antenna array with a number of transmitters and a number of receivers is used.

In DE 10 2008 052 246 A1 a sensor system with an adjustable elevation beam direction for the vertical position determination of objects is described. The adjustment takes place here by mechanically moving a reflector.

In PCT/EP2012/003702 an imaging radar sensor with synthetic enlargement of the antenna aperture and two-dimensional beam sweep is described. The two-dimensional beam sweep takes place here in the horizontal by digital beamforming from a number of receiving channels, and in the vertical by comparing the amplitudes of two receiving signals which are generated by two transmitters which have an antenna diagram tilted relative to one another in the vertical. However, a disadvantage of this method in practice is that by means of structures upstream of the sensor, such as radomes, plastic bumpers and similar coverings, the amplitude characteristic of the antenna diagrams is distorted. This means that the radar sensor is to be calibrated according to the covering in order to record these distortions metrologically and to compensate for them.

SUMMARY

The object of the invention is to make available a device, a method and a radar system with which the disadvantages described above such as mechanical beam sweep and calibration are avoided. Furthermore, it is the object of the invention to make available a device and a method with which a vertical position of an object can be determined.

The object is achieved by the device that has the features of claim 1, by the method that has the features of claim 4 and by the radar system that has the features of claim 3.

BRIEF DESCRIPTION OF THE DRAWINGS

FIG. 1 is a schematic diagram showing a physical arrangement of transmitters and receivers.

FIG. 2 is a plot showing a time chart and modulation form.

FIG. 3A is an antenna diagram of two adjacent antenna beams.

FIG. 3B is a plot showing an amplitude ratio of the two adjacent antenna beams from FIG. 3A.

DETAILED DESCRIPTION

The sensor consists at least of two transmitting antennas and an array of receiving antennas within the distance d. The phase centres of the transmitting antennas are offset in the vertical by the distance z which is smaller than or equal to half the free space wavelength (1) of the emitted signal, in particular in order to guarantee clarity and in order to avoid any ambiguity. The switchable transmitting antennas therefore have different vertical positions of the phase centres, i.e. a first position of the phase centre of the first switchable transmitting antenna, a second position of the phase centres of the second switchable transmitting antenna, etc., by means of which the vertical positions of the phase centres are different, which phase centres are offset vertically by the distance z. In the horizontal the second antenna is offset to the first antenna by the line spacing of the receiving array d.

For the line spacing of the receiving array d the following applies:

$$d := \frac{1 - \frac{1}{N}}{1 + \sin(\varphi max \cdot \frac{\pi}{180})} \cdot \lambda \qquad [1]$$

where
N=number of antenna lines
1=wavelength of the emitted signal
fmax=maximum sweep angle of the digitally formed antenna beam.

FIG. 1 shows an example of this type of antenna arrangement, produced with planar antenna structures.

The detection of an object in the three-dimensional space is now carried out as follows:

As can be seen in FIG. 2, transmitter 1 and transmitter 2 are operated alternately, in the case of a so-called FMCW radar the frequency being detuned linearly. During the detuning the received signal is recorded by an AD converter, is subjected to a first Fast Fourier Transform (FFT) and is saved. The stored data are then sorted according to the respectively active transmitter and located in a spectrogram. After this, a second FFT is calculating the columns of the spectrogram. As a result one obtains the so-called Range-Doppler matrix, the column numbers of which correspond to the distance units (so-called range bins) and the line numbers of which correspond to the velocity units (so-called velocity bins) of the radar sensor. The complex matrix elements correspond to the amplitude and the phase of the signal.

According to digital beamforming—as described in detail in PCT/EP2012/003702—the array diagram of the receiving array is now formed. Here the Range-Doppler matrices of the individual receiving channels are first of all weighted, are then shifted according to the desired beam directions (γ) in the phase (α) and are then added up. One then obtains a series of Range-Doppler matrices which correspond to the received signals of the main beam directions of the receiving array. After these are available, one searches in the individual Range-Doppler matrices with the aid of a so-called CFAR algorithm for objects which can be distinguished from the noise of the sensor or the interfering background—so-called clutter. If such an object is detected, the same Range-Doppler cell of the adjacent beam is used for the precise horizontal angle determination by the so-called monopulse principle. Here, one can either consider only the amplitude ratio of the two adjacent beams, as shown in FIG. 3 a,b, or the so-called error signal. This is generated by the sum signal first of all being formed, i.e. the two elements of the adjacent matrices are added up vectorially. The differential signal is then formed, and the differential signal is divided by the sum signal. The real part of this division of two complex numbers is identified as the so-called error signal. The error signal is proportional to the relative angle between the two beams that are considered. In this way the horizontal position can be determined precisely.

Instead of searching for the beam in which the object is located, and instead of precisely determining the horizontal angle by the monopulse method, one could simply reverse the principle of digital beam alignment according to the object and measure the phase shift between two adjacent lines of antennas. The following then applies:

$$\alpha := -2\pi \cdot \frac{d}{\lambda} \cdot \sin(\gamma) \quad [2]$$

From this the horizontal alignment of the object can therefore be measured directly. In practice, however, the signal of the individual channels is too weak and is overlaid by noise, and so precise phase measurement between the channels is not possible. If, however, the object signal is sufficiently strong, one can derive a measuring method from this.

The innovation is now to apply this measuring method to vertical position determination of the object.

The digital beamforming is first of all carried out with the sets of data of the two transmitting antennas.

The object in the set of data of the first antenna, or the beam number and the element of the Range-Doppler matrix is then detected.

The phase difference (β) in comparison to the same element of the Range-Doppler matrix of the same beam No. is then measured from the set of data of the second antenna. Since the transmitting antennas are mutually offset in the vertical by the distance z the following applies as above:

$$\beta := -2\cdot\pi \cdot \frac{z}{\lambda} \cdot \sin(\varphi) \quad [3]$$

The angle φ here is the vertical angular position of the object. In contrast to the horizontal approach the method works here because the phase difference is determined from the array beam. Here, the signal to noise ratio is sufficiently high. Equation [3] only applies, however, if the phase centre of the second antenna is in the same horizontal position as the first antenna. However, this is not possible with planar lines of antennas that are extended in the vertical. For this reason the lines of antennas are to be offset in the horizontal. Preferably, one chooses the same distance (d) here as the line spacing in the receiving array.

The angle (βm) that is now measured is the sum of the vertical phase difference β and the horizontal phase difference α. With equation [3] the vertical object position φ is then given by:

$$\varphi := \operatorname{asin}\left(\frac{\beta m - \alpha}{2\cdot\pi\cdot\frac{z}{\lambda}}\right) \quad [4]$$

The accuracy of the determination of the vertical position therefore depends not only upon the signal to noise ratio, but also upon the accuracy with which the horizontal angular position γ, and so the phase difference α, can be determined.

In order to avoid ambiguities with extreme vertical angular positions, vertical spacing of the phase centres that is less than equal to λ/2 is preferably chosen.

If the object now moves, the measured phase is overlaid by a phase shift by the Doppler effect. This phase shift between the set of data from the measurement from antenna 1 to antenna 2 is to be corrected before the angle calculation.

The phase correction of the Range-Doppler matrices from the second measurement are therefore by the angle $$\Delta\phi := 2\cdot\pi\cdot ldopp\cdot\delta fd\cdot\Delta T$$

where ldopp: Doppler filter No.

δfd: bandwidth of the Doppler filter

ΔT: time offset between the activation of the left and the right transmitter

The Doppler filter No. corresponds here to the line number of the Range-Doppler matrix. The bandwidth is calculated from the object observation period according to the formula $$\delta fd := \frac{fm}{Nsweep}$$

where 1/fm=duration of the frequency ramp from FIG. 2 and

Nsweep=number of frequency ramps.

The invention claimed is:

1. A device for determining a position of an object in a three-dimensional space, the device comprising:
   at least two switchable transmitting antennas each arranged in a corresponding line in a vertical direction, the at least two switchable transmitting antennas having different vertical positions of their respective phase centers;
   a plurality of receiving antennas spaced apart from one another in the horizontal direction, the transmitting antennas being spaced apart a distance in the horizontal direction that corresponds to a horizontal distance between two adjacent receiving antennas; and
   a display device,
   wherein the device is a radar sensor configured to determine the position of the object, wherein determining the position of the object comprises:

receiving a sequence of signals sent in chronological succession by the transmitting antennas and reflected from the object;
digitizing the received signals, and
interlinking the digitized signals to form a number of bundled antenna beams by a digital beam-forming method, and
determining a vertical position of the object based on a relationship:

$$\phi = a\sin\left(\frac{\beta m - \alpha}{2\pi\frac{z}{\lambda}}\right),$$

wherein $\phi$ is the vertical position of the object,
wherein $\beta$ is a vertical phase difference between (i) a first antenna beam corresponding to the signals sent by a first transmitting antenna of the at least two switchable transmitting antennas and reflected from the object, and (ii) a second antenna beam corresponding to the signals sent by a second transmitting antenna of the at least two switchable transmitting antennas and reflected from the object,
wherein $\alpha$ is a horizontal phase difference between the first antenna beam and the second antenna beam,
wherein z is a vertical difference between the phase center of the first transmitting antenna and the phase center of the second transmitting antenna, and
wherein $\lambda$ is a wavelength of the signals sent by the first and the second transmitting antennas, and
wherein the display device is configured to display the position of the object.

2. The device according to claim 1, wherein the radar sensor is configured to evaluate amplitudes of adjacent antenna beams in order to achieve a higher horizontal angular resolution in an angular range of observation relative to a horizontal angular resolution in the absence of the amplitude evaluation.

3. The device according to claim 2, wherein the radar sensor is configured to evaluate a sum of and a difference between two adjacent antenna beams in order to achieve a higher horizontal angular resolution relative to a horizontal angular resolution in the absence of the sum and difference evaluations.

4. The device according to claim 1, wherein the transmitting antennas are identical in construction.

5. The device according to claim 1, wherein the receiving antennas are arranged in corresponding vertical lines arranged parallel to one another.

6. The device according to claim 5, wherein the vertical lines of the transmitting antennas are arranged parallel to the vertical lines of receiving antennas.

7. The device according to claim 1, wherein the phase centres of the transmitting antennas are offset in the vertical by a distance which is smaller than or equal to half the free space wave length of a signal emitted by the transmitting antennas.

8. The device according to claim 2, wherein the displayed position of the object is based on a number of antenna diagrams correspond to the number of bundled antenna beams.

9. A radar system, comprising the device for determining the position of the object in the three-dimensional space according to claim 1.

10. A method for determining a position of a moving object, comprising:
receiving, by a plurality of receiving antennas, a sequence of chronologically consecutive received signals sent by at least two switchable transmitting antennas arranged in corresponding lines in a vertical direction and with different vertical phase centers, the received signals being reflected from the object before being received by the plurality of receiving antennas, the plurality of receiving antennas being spaced apart from one another in a horizontal direction, the transmitting antennas being spaced apart a distance which corresponds to a horizontal distance between two adjacent antennas of the receiving antennas;
digitizing the received signals;
interlinking the digitized received signals by digital beam-forming to form a number of bundled antenna beams;
applying a two-dimensional FFT and measuring a time offset between the transformed digitized received signals corresponding to a first transmitting antenna and a second transmitting antenna of the at least two transmitting antennas to apply a velocity correction;
determining the position of the object, wherein a vertical position of the object is determined based on the relationship:

$$\phi = a\sin\left(\frac{\beta m - \alpha}{2\pi\frac{z}{\lambda}}\right),$$

wherein $\phi$ is the vertical position of the object,
wherein $\beta$ is a vertical phase difference between (i) a first antenna beam corresponding to the signals sent by the and reflected from the object, and (ii) a second antenna beam corresponding to the signals sent by the second transmitting antenna and reflected from the object,
wherein $\alpha$ is a horizontal phase difference between the first antenna beam and the second antenna beam,
wherein z is a vertical between the phase center of the first transmitting antenna and the phase center of the second transmitting antenna, and
wherein $\lambda$ is a wavelength of the signals sent by the first and the second transmitting antennas; and
displaying the position of the object.

11. The method according to claim 10, wherein the amplitudes of adjacent antenna beams are evaluated to achieve a higher horizontal angular resolution within an angular range of observation relative to a horizontal angular resolution in the absence of the amplitude evaluation.

12. The method according to claim 10, wherein a sum of and a difference between two adjacent antenna beams are evaluated to achieve a higher horizontal angular resolution relative to a horizontal angular resolution in the absence of the sum and difference evaluations.

13. The method according to claim 10, wherein the phase centers of the transmitting antennas are offset in the vertical by a distance which is smaller than or equal to half the free space wavelength of the emitted signal.

* * * * *